Feb. 14, 1933.    W. J. BUTTFIELD    1,897,360
MANUFACTURE OF STANNIC CHLORIDE
Filed July 9, 1929    2 Sheets-Sheet 1

INVENTOR
WILLIAM J. BUTTFIELD
BY
ATTORNEYS

Feb. 14, 1933.   W. J. BUTTFIELD   1,897,360
MANUFACTURE OF STANNIC CHLORIDE
Filed July 9, 1929   2 Sheets-Sheet 2

INVENTOR
WILLIAM J. BUTTFIELD
BY
Pennie, Davis, Marvin + Edmonds
ATTORNEYS

Patented Feb. 14, 1933

1,897,360

UNITED STATES PATENT OFFICE

WILLIAM JAMES BUTTFIELD, OF NORTH PLAINFIELD, NEW JERSEY, ASSIGNOR TO THE VULCAN DETINNING COMPANY, OF SEWAREN, NEW JERSEY, A CORPORATION OF NEW JERSEY

MANUFACTURE OF STANNIC CHLORIDE

Application filed July 9, 1929. Serial No. 376,990.

This invention relates to the manufacture of stannic chloride or the like, and has for its object improvements in the manufacture of stannic chloride. The invention contemplates, more particularly, an improved method of and apparatus for manufacturing anhydrous stannic chloride and the like.

Anhydrous stannic chloride, or tetrachloride of tin ($SnCl_4$), as it is commonly designated, has heretofore been made by bringing metallic tin and dry chlorine gas into active relation with one another. The reaction may be indicated as follows:

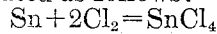
$$Sn + 2Cl_2 = SnCl_4$$

Metallic tin, in the form of bars or pigs, is placed in a closed vessel and chlorine gas is forced into the vessel. The reaction is exothermic, approximately 896 B. T. U. being generated per pound of tetrachloride of tin produced.

In order to reach any commercially feasible rate of production, it is necessary to have the largest possible surface area of tin exposed to the action of the chlorine gas, but, unless some means is employed to remove the heat generated, the tin soon melts and the exposed surface area of tin is so greatly reduced that production of tetrachloride of tin is reduced to a negligible rate. The heat of reaction is so great that, unless the heat is dissipated in some way, the temperature rises rapidly and the tin is soon heated to its melting point.

As the bars or pigs of tin are reduced in size, the danger of melting is increased because the ratio of surface area to weight is increased. The molten tin, flowing to the bottom of the vessel, clogs such outlets as are used to withdraw the tetrachloride of tin produced. Metallic iron is attacked by chlorine gas at elevated temperatures, and, since the reaction vessel employed is most conveniently and cheaply made of iron, there is danger that the vessel will be destroyed and that the tetrachloride of tin will be unduly contaminated, unless the temperature is carefully controlled.

In connection with this heretofore customary method of manufacturing tetrachloride of tin, it has been proposed to dissipate the heat resulting from the reaction by circulating the chlorine gas in the vessel through a series of cooling pipes located away from the zone of reaction, the pipes being cooled by water or other suitable means. This is very inefficient because the chlorine gas has a low specific heat and is a poor conductor of heat. Moreover, there are likely to be dead air spaces or pockets among the bars or pigs of tins in the vessel that are not reached by the circulating chlorine gas, at which points melting of the tin readily occurs. For this reason it has been necessary to control the temperature by admitting the chlorine at a slow rate; which, of course, also reduces the rate of production.

Attempts have been made to overcome the difficulties enumerated, at least in part. Very large vessels, or a large number of small vessels, have been employed in order to attain production of anhydrous stannic chloride upon a commercial basis. The cost of installation is therefore high, and, in addition, large quantities of tin, an expensive commodity, are tied up, thus making necessary a large capital investment. Tetrachloride of tin is, moreover, very volatile so that the larger the number or size of the vessels used, the greater will be the loss of tin in the form of vapor when the vessels are opened for recharging. This is of special importance when the temperature is high, because the vapor pressures of the tetrachloride of tin and of the chlorine gas confined within the reaction vessel increase rapidly with increasing temperatures.

It has also been proposed to manufacture anhydrous stannic chloride by immersing metallic tin in a liquid medium saturated with chlorine gas, in which case the chlorine dissolved in the liquid reacts with the tin to form tetrachloride of tin. The liquid medium suggested is the tetrachloride of tin itself. This method is commercially impracticable, because the tetrachloride of tin will only dissolve a comparatively small quantity of chlorine. The solubility of chlorine, moreover, in such a liquid medium decreases rapidly as the temperature increases, so that as soon as the liquid becomes heated, due to the heat of reaction, the chlorine gas is liberated and rises to the surface of the liquid instead of reacting with the immersed tin. This uncombined gas accumulates in the reaction vessel, and unless it is allowed to escape, it causes an increase in pressure in the vessel. The pressure, therefore, soon becomes dangerously high. If allowed to escape, not only is there a prohibitive loss of chlorine, but there is also carried off a considerable quantity of tetrachloride of tin vapor that can only be recovered with considerable difficulty.

It is, therefore, apparent that the heretofore customary methods of manufacturing stannic chloride are not highly satisfactory, and that they at best leave something to be desired. In spite of the numerous efforts made to improve these processes, they still remain highly inefficient, costly and dangerous.

In accordance with the practice of the present invention, the disadvantages of the foregoing methods are for the most part eliminated, and it is possible to attain a very large production of stannic chloride or the like in comparatively small vessels with no danger of melting the metallic tin employed, and with but slight losses of chlorine gas and tetrachloride of tin vapor.

According to the process of the present invention anhydrous stannic chloride is manufactured by bringing together metallic tin immersed in a liquid medium and chlorine gas,—the liquid medium preferably being one that is not affected by chlorine, that has a boiling point below the melting point of tin, and that will not react with the tetrachloride of tin produced. In addition to conducting the reaction in such a liquid medium, the following steps, alone or in combination, are contemplated: A portion of the liquid mixture is withdrawn from the zone of reaction and cooled, after which the cooled liquid is returned at least in part to the zone of reaction. The unconsumed chlorine gas that rises from the surface of the liquid medium is withdrawn and, if desired, cooled, after which it is returned to the zone of reaction. The liquid is brought to its boiling temperature, and vapor and chlorine gas are together withdrawn and cooled, the condensate and cooled gas being returned to the zone of reaction.

In the practice of this invention metallic tin, preferably in the form of bars, is placed in a closed reaction vessel provided with suitable outlets and inlets, after which a sufficient quantity of liquid is admitted completely to cover the tin. The liquid medium used is preferably one that is not affected by chlorine, that will not react with the tetrachloride of tin produced so as to impair its quality, and that has a boiling point below the melting point of tin. The preferred liquid is the tetrachloride of tin, although other liquids meeting the above requirements may be used, such, for example, as carbon tetrachloride ($CCl_4$). It is also possible to use a liquid medium having a boiling point higher than (or equal to) the melting point of tin, provided the temperature of the reaction mixture is carefully controlled, such as by sufficiently cooling the gas or liquid or both. Also, a liquid medium may be used which is affected by the chlorine, provided, however, that the reaction product is not one which contaminates the tetrachloride of tin produced. Chlorine gas is then admitted through an opening in the bottom of the vessel. In bubbling upwardly, the chlorine gas comes in contact with the immersed metallic tin, reacting with the same to form tetrachloride of tin, in accordance with the equation set out above.

While much of the chlorine gas bubbling through the liquid medium reacts with the metallic tin, a considerable portion of the gas will bubble completely through the liquid without reacting. In accordance with the practice of the present invention, this unconsumed chlorine gas is returned to the bottom of the vessel, and reintroduced into the liquid medium.

Since the tin is at all times submerged in the liquid medium, and since the liquid medium itself has a boiling point lower than the melting point of tin, at least in the present preferred practice of the invention, no melting of the tin can occur. In case a liquid medium having a boiling point higher than (or equal to) the melting point of tin is employed, sufficient cooling effects can be obtained to inhibit the melting of the tin.

In order to remove heat generated by the reaction, the liquid mixture within the vessel is, at least in part, advantageously withdrawn from the zone of reaction and passed through cooling pipes, the pipes being cooled by water or other suitable means. Cooling the liquid mixture is more efficient than cooling the chlorine gas, since the liquid mixture has a higher specific heat and is a better conductor of heat than is the chlorine gas.

It is also desirable, however, to circulate and cool the chlorine gas for at least two reasons: first, to obtain a still greater transfer of heat, and therefore a greater production of tetrachloride of tin; and, second to cool the chlorine gas and tetrachloride of tin vapor accompanying the chlorine, so as to condense as much of the tetrachloride of tin as possible, thereby reducing the amount of tin lost in the form of vapor when the vessel is opened for recharging.

According to a still further feature of the present invention, a liquid having a boiling point below the melting point of tin is used and the temperature in the reaction vessel is allowed to rise to the boiling point of the liquid. When this temperature is reached, the liquid vaporizes and heat is absorbed. The extent to which heat is absorbed may be illustrated as follows: The latent heat of vaporization of stannic chloride is about 84 B. t. u. per pound, and the heat of formation of stannic chloride is about 896 B. t. u. per pound. It is, therefore, evident that the vaporization of about 10.6 pounds of tetrachloride of tin will absorb the heat generated in the reaction producing one pound of the tetrachloride of tin. A very substantial cooling effect can therefore be obtained by conducting the process at the boiling point of the liquid medium or bixture employed.

In the practice of the foregoing feature of the present invention, the vapors of the distilled liquid, together with any unconsumed chlorine gas, are conducted into a condenser, where the vapors are condensed. The condensate is returned, at least in part, to the chlorinating vessel, serving to maintain sufficient liquid in the vessel to keep the same at a normal operating level, the surplus being drawn off to keep the level from rising too high. The unused chlorine gas passes through the condenser where it is cooled, and is returned to the bottom of the vessel for re-use.

This method of removing heat from the zone of reaction is very efficient, because the liquid vapors have a relatively high specific heat, and since they are at a comparatively high temperature, the heat transfer between them and the cooling medium is high. The temperature within the reaction vessel is, furthermore, automatically maintained at the boiling point of the liquid medium employed, which makes possible a high rate of production of tetrachloride of tin.

The invention will undoubtedly be better understood by reference to the accompanying drawings, taken in conjunction with the following description, in which:

Fig. 1 is a diagrammatic representation of apparatus adapted for the practice of the invention; and Fig. 2 is a diagrammatic representation of a modified form of apparatus, also adapted for the practice of the invention.

The apparatus shown comprises a reaction vessel 10, preferably constructed of metal, such as iron or steel. In close proximity to the reaction vessel is a heat-interchanger 11. The reaction vessel and heat-interchanger are connected by means of a cooling coil 12, the coil connecting with the reaction vessel at two places: just below the normal liquid operating level 13 by means of conduit 14; and at or near the bottom of the reaction vessel by means of conduit 15.

In addition to the cooling coil, the heat-interchanger comprises a tank adapted to surround the cooling coil. By means of a valved pipe connection 16, regulated amounts of water may be introduced into the tank, preferably at the bottom, and an off-take pipe 17, at or near the top of the tank, is provided for the withdrawal of water. A pump (not shown) may advantageously be associated with at least one of the conduits, preferably the lower one, for circulating liquid from the reaction vessel through the cooling coil.

The reaction vessel comprises a main body portion equipped with a removable top 18. A perforated platform 19 is located at or near the bottom of the reaction vessel, adapted to support a load of metallic tin 20, preferably in the form of bars or pigs. The platform contains a large number of relatively small holes, adapted to disseminate small bubbles of chlorine gas. The bottom of the reaction vessel is equipped with a valved outlet 21 for the withdrawal of liquid. The bottom of the vessel also contains a valved inlet 22 adapted for the introduction of chlorine gas, and liquid (if desired).

A condenser 23 is in close proximity to the reaction vessel. It comprises a tank through which extends a cooling coil 24. A conduit 25 connects the upper end of the reaction vessel, above the normal liquid operating level, with the cooling coil. A pump 26 is interposed between the conduit and the cooling coil. The conduit connects with the reaction vessel above the normal operating liquid level, so that unconsumed gas and vapor may be conducted from the vessel to the condenser. A conduit 27 connects with the cooling coil of the condenser and the lower end of the reaction vessel, preferably by means of the gas inlet 22. A valved water inlet 28, preferably at or near the bottom, and an off-take pipe 29, at or near the top, are associated with the condenser tank for the introduction and withdrawal of cooling water.

Referring more particularly to the modified form of apparatus shown in Fig. 2, the conduit 25 connecting the reaction vessel and cooling coil 24 is not equipped with a pump. The pump 26 is located, instead, in the conduit 27 which connects the reaction vessel at its lower end with the cooling coil 24. A trap 28a is located between the pump and the cooling coil in order to collect condensate. This trap is in turn connected with a pipe line 29a leading into the reaction vessel, and adapted to convey condensate to the reaction vessel at a point above its normal operating liquid level. A valved outlet 30 is provided in the pipe line for withdrawing condensate, if desired.

The apparatus described above may be operated as follows in the practice of the invention:

To begin operations, the lid 18 is removed from the reaction vessel 10. An appropriate number of bars of metallic tin 20 are suitably piled on the perforated platform 19. While the valves in the outlet 21 and inlet 22 are closed, the liquid medium contemplated by the invention is poured into the reaction vessel. In the present preferred practice of the invention, liquid tetrachloride of tin is itself employed as the liquid medium. A sufficient amount of the liquid is introduced into the vessel completely to immerse the bars of metallic tin, and to bring the height of the liquid in the vessel to the normal operating level 13. The lid 18 is then clamped onto the reaction vessel.

The valve in the gas inlet 22 is then suitably opened, and chlorine gas is introduced into the reaction vessel. The chlorine finds its way to the platform 19, where it is disseminated by the perforations to form a relatively large number of chlorine gas bubbles. These bubbles of chlorine rise upwardly among the bars of tin, and contact with the tin. The reaction between chlorine and tin indicated above then takes place to form tetrachloride of tin.

The heat of reaction is such that the contents of the reaction vessel promptly rise in temperature. In order to dissipate some of the heat in order to avoid overheating, various steps may be followed: Thus, for example, the liquid may be circulated through the heat-interchanger 11. This circulation may be effected by thermal siphon action, or by means of a pump (not shown). The heated liquid is advantageously passed from the reaction vessel to the cooling coil 12 through the pipe 14. The cooled liquid returns from the cooling coil to the reaction vessel through conduit 15. During the cooling operation, regulated amounts of cooling water are introduced into the heat-interchanger by means of the valved pipe 16. The overflow water escapes by way of the outlet pipe 17.

Referring more particularly to the operation to be conducted in the apparatus shown in Fig. 1, the use of the heat-interchanger 11 may be avoided, or not, or varied, as desired. While much of the chlorine gas bubbling upwardly through the liquid will react with the immersed metallic tin, a considerable portion of the gas will rise to and accumulate around the upper end of the reaction vessel. In order to cool the now highly heated chlorine gas, it is advantageously circulated through the condenser (or heat-interchanger) 23 by means of the conduit 25, pump 26, cooling coil 24, and return conduit 27. During this cooling operation, regulated amounts of cooling water are introduced into the condenser by means of the valved inlet 28. Overflow water escapes by way of the outlet 29. The cooled chlorine gas is reintroduced into the reaction vessel through the gas inlet pipe 22.

It is, of course, apparent that if the liquid within the reaction vessel is heated to its boiling point, liquid vapor will accumulate together with the unconsumed chlorine gas at the upper end of the reaction vessel. This vapor is also circulated through the condenser. The cooling to which it is subjected reduces the vapor, at least for the most part, to a liquid condensate. This condensate is preferably reintroduced into the reaction vessel, together with the accompanying chlorine gas, although it may be withdrawn from the system in whole or in part.

The heat inter-changer 11 and the condenser 23 may be made to work inter-dependently in order to effect a control over temperature conditions within the reaction vessel. A relatively large, or small, amount of the liquid may be withdrawn from the reaction vessel and circulated through the heat-interchanger 11. In fact, it may at times be advantageous not to circulate any of the liquid through the heat-interchanger. At the same time unconsumed hot chlorine gas is circulated through the condenser 23 for cooling.

As the immersed tin is converted to tetrachloride of tin, and the amount of liquid within the reaction vessel tends to increase in amount, suitable amounts of liquid may be withdrawn through the valved outlet 21 to keep the level of the liquid within the reaction vessel at its normal operating level 13. Under accurately controlled operating conditions, the valve in outlet 21 may be adjusted to withdraw tetrachloride of tin substantially as fast as it is made.

The apparatus shown in Fig. 2 may be operated substantially like that shown in Fig. 1, and as just described above. This form of apparatus is particularly adapted for the manufacture of anhydrous stannic chloride when the operation is to be conducted at boiling temperatures, and advantage is to be taken of the cooling effects obtainable at such temperatures. In the apparatus shown, the mixture of unconsumed chlorine gas and liquid vapor are together circulated through the condenser 23. The condensed vapor collects in the trap 28a, from which it may be suitably returned to the reaction vessel or may be withdrawn in whole or in part from the system. The unconsumed but cooled chlorine gas, on the other hand, is conducted through the pump 26 and forced through the conduit 27 back into the reaction vessel.

It is, of course, to be understood that the examples of the practice of the invention just described are not to be taken as restrictive of the scope of the invention. To those skilled in this art, other variations of the practice of the invention will undoubtedly suggest themselves. The principles of the invention have a wider application than in the specific illustrations just outlined.

I claim:

1. The method of manufacturing anhydrous stannic chloride which comprises bringing together metallic tin immersed in a liquid medium and chlorine gas, withdrawing a portion of the liquid mixture from the zone of reaction and cooling the same, and then returning the cooled liquid mixture at least in part to the zone of reaction.

2. The method of manufacturing anhydrous stannic chloride which comprises immersing metallic tin in a liquid medium, bubbling chlorine gas upwardly through the body of liquid, and recirculating chlorine gas that escapes from the body of liquid back into the body of liquid.

3. The method of manufacturing anhydrous stannic chloride which comprises immersing metallic tin in a liquid medium, bubbling chlorine gas upwardly through the body of liquid, withdrawing chlorine gas that escapes from the surface of the liquid mixture and cooling the same, and then recirculating the cooled chlorine gas back into the reaction mixture.

4. The method of manufacturing anhydrous stannic chloride which comprises immersing metallic tin in a liquid medium, bubbling chlorine gas upwardly through the body of liquid, withdrawing a portion of the liquid mixture from the zone of reaction and cooling the same, returning the cooled liquid at least in part back to the zone of reaction, and recirculating chlorine gas that escapes from the body of liquid back into the body of liquid.

5. The method of manufacturing anhydrous stannic chloride which comprises immersing metallic tin in a liquid medium, bubbling chlorine gas upwardly through the body of liquid, withdrawing chlorine gas that escapes from the surface of the liquid mixture and cooling the same, and then recirculating the cooled chlorine gas and condensate back into the reaction mixture.

6. The method of manufacturing anhydrous stannic chloride which comprises immersing metallic tin in a liquid medium that has a boiling point below the melting point of the tin, bubbling chlorine gas upwardly through the body of liquid, allowing the heat of reaction to heat the mixture to the boiling point of the liquid, withdrawing vapor and unconsumed chlorine gas and cooling them, and returning condensate at least in part to the reaction zone.

7. The method of manufacturing anhydrous stannic chloride which comprises immersing metallic tin in a liquid medium that has a boiling point below the melting point of the tin, bubbling chlorine gas upwardly through the body of liquid, allowing the heat of reaction to heat the mixture to the boiling point of the liquid, withdrawing vapor and unconsumed chlorine gas and cooling them, and returning the unconsumed chlorine gas to the body of liquid.

8. The method of manufacturing anhydrous stannic chloride which comprises immersing metallic tin in a liquid medium that has a boiling point below the melting point of the tin, bubbling chlorine gas upwardly through the body of liquid, allowing the heat of reaction to heat the mixture to the boiling point of the liquid, withdrawing vapor and unconsumed chlorine gas and cooling them, and returning condensate and the unconsumed chlorine gas to the body of liquid.

9. The method of manufacturing anhydrous stannic chloride which comprises bringing together metallic tin, liquid tetrachloride of tin and chlorine gas in reactive relation, withdrawing a portion of the liquid from the zone of reaction, and cooling the same, and then returning the cooled liquid at least in part to the reactive zone.

10. The method of manufacturing anhydrous stannic chloride which comprises bringing together metallic tin, liquid tetrachloride of tin and chlorine gas in reactive relation, continuously withdrawing unconsumed chlorine gas and cooling the same, and continuously returning the cooled chlorine gas to the reactive zone.

11. The method of manufacturing anhydrous stannic chloride which comprises bringing together metallic tin, liquid tetrachloride of tin and chlorine gas in reactive relation, continuously withdrawing unconsumed chlorine gas and continuously returning the chlorine gas to the reactive zone.

12. The method of manufacturing anhydrous stannic chloride which comprises bringing together metallic tin, liquid tetrachloride of tin and chlorine gas in reactive relation, allowing the heat of reaction to heat the mixture to the boiling point of the liquid, continuously withdrawing vapor and unconsumed chlorine gas and cooling them, and continuously returning condensate at least in part and unconsumed chlorine gas to the reaction zone.

13. The method of manufacturing anhydrous stannic chloride which comprises bringing together metallic tin, liquid tetrachloride of tin and chlorine gas in reactive relation, allowing the heat of reaction to heat the mixture to the boiling point of the liquid, continuously withdrawing vapor and unconsumed chlorine gas and cooling them, and continuously returning the unconsumed chlorine gas to the body of liquid.

14. The method of manufacturing anhydrous stannic chloride which comprises bringing together metallic tin, liquid tetrachloride of tin and chlorine gas in reactive relation, allowing the heat of reaction to heat the mixture to the boiling point of the liquid, continuously withdrawing vapor and unconsumed chlorine gas and cooling them, and continuously returning condensate and the unconsumed chlorine gas to the body of liquid.

15. In a process of manufacturing anhydrous stannic chloride according to which chlorine gas is made to contact with metallic tin submerged in a body of liquid tetrachloride of tin, the steps which comprise bubbling the chlorine gas upwardly through the body of tetrachloride of tin to contact with the submerged tin, withdrawing hot unconsumed chlorine gas continuously from the top of the body of tetrachloride of tin, cooling the hot unconsumed chlorine gas so withdrawn, and returning the cooled chlorine gas to the bottom of the body of liquid tetrachloride of tin again and permitting the cool chlorine gas to bubble upwardly to contact with the metallic tin.

16. A process according to the preceding claim, in which unconsumed chlorine gas and tetrachloride of tin vapors are together withdrawn from the top of the body of tetrachloride of tin and cooled to a point at which vapors are condensed, the condensed tetrachloride of tin and the cooled unconsumed chlorine gas being returned to the main body of liquid tetrachloride of tin.

17. In a process of manufacturing anhydrous stannic chloride according to which chlorine gas is made to contact with metallic tin submerged in a body of liquid tetrachloride of tin, the steps which comprise bubbling the chlorine gas upwardly through the body of tetrachloride of tin in contact with the submerged tin, continuously withdrawing hot liquid tetrachloride of tin from the main body of liquid tetrachloride of tin, cooling the hot liquid tetrachloride of tin so withdrawn, and returning the cooled tetrachloride of tin to the main body of tetrachloride of tin, the movement of hot liquid tetrachloride of tin from the main body of liquid and the returning of cooled tetrachloride of tin to the main body of liquid being effected by thermal siphon action to effect continuous circulation.

18. In the chlorination of tin, the process which comprises submerging tin in a liquid bath of tin chloride and passing gaseous chlorin through the bath in contact with said tin, the flow of chlorin being greater than the rate of absorption, so that excess chlorin passes forward in admixture with vapors of tin chloride.

19. In the chlorination of tin, the process which comprises submerging tin in a bath of liquid tin chloride, passing a rapid current of chlorin in excess through the bath, collecting and cooling the effluent mixture of gas and vapor to condense liquid chloride, and returning the residual chlorin for recirculation through said bath.

20. In the manufacture of tin chloride, the process which comprises submerging tin in a bath of liquid tin chloride, passing a substantial excess of chlorin through said liquid bath, removing the mixed vapors of chlorin and chloride thus produced, cooling the mixed vapors to condense and separate liquid chloride from the chlorin, and introducing the cooled chlorin into said liquid bath.

21. In the manufacture of tin chloride, the process which comprises submerging tin in a bath of liquid tin chloride, passing a substantial excess of chlorin through said liquid bath, removing the mixed vapors of chlorin and chloride thus produced, cooling the mixed vapors to condense and separate liquid chloride from the chlorin, introducing the condensed liquid chloride into said liquid bath and reintroducing the cooled chlorin into said liquid bath.

In testimony whereof I affix my signature.
WILLIAM JAMES BUTTFIELD.